United States Patent
Kau et al.

(10) Patent No.: US 9,936,068 B2
(45) Date of Patent: Apr. 3, 2018

(54) COMPUTER-BASED STREAMING VOICE DATA CONTACT INFORMATION EXTRACTION

(71) Applicant: International Business Machines Corporation, Armonk, NY (US)

(72) Inventors: Christian B. Kau, Los Altos, CA (US); Jerald T. Schoudt, Douglassville, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/450,411

(22) Filed: Aug. 4, 2014

(65) Prior Publication Data
US 2016/0036969 A1   Feb. 4, 2016

(51) Int. Cl.
*H04M 1/64* (2006.01)
*H04M 3/42* (2006.01)

(52) U.S. Cl.
CPC ... *H04M 3/42093* (2013.01); *H04M 3/42221* (2013.01)

(58) Field of Classification Search
CPC ....... H04M 1/274516; H04M 1/72552; H04M 2201/40; H04M 2201/60; H04M 3/42221
USPC .......................................... 379/88.01–88.19
See application file for complete search history.

(56) References Cited

U.S. PATENT DOCUMENTS

| | | | |
|---|---|---|---|
| 4,924,496 A | 5/1990 | Figa et al. | |
| 5,003,574 A | 3/1991 | Denq et al. | |
| 5,602,908 A | 2/1997 | Fan | |
| 5,883,943 A | 3/1999 | Siddiqui | |
| 6,278,772 B1 | 8/2001 | Bowater et al. | |
| 6,542,602 B1 | 4/2003 | Elazar | |
| 7,593,517 B2 | 9/2009 | Walsh et al. | |
| 2002/0161627 A1* | 10/2002 | Gailey et al. | 705/10 |
| 2003/0026392 A1 | 2/2003 | Brown et al. | |
| 2006/0246891 A1* | 11/2006 | Rao | H04M 3/53333 455/426.1 |
| 2007/0098145 A1* | 5/2007 | Kirkland | H04M 1/2745 379/201.01 |
| 2009/0124272 A1* | 5/2009 | White | G10L 15/30 455/466 |
| 2009/0299743 A1* | 12/2009 | Rogers | 704/235 |

(Continued)

FOREIGN PATENT DOCUMENTS

| EP | 0425161 A2 | 5/1991 |
|---|---|---|
| EP | 0935380 A2 | 8/1999 |

OTHER PUBLICATIONS

Gabor Seymour, "Teleservice Voice Transmissions annotated with Web-Access Pointers," IP.com, IPCOM000009362D, Motorola, Inc., Technical Developments, Jun. 1, 1999, pgs. 273-277.

(Continued)

*Primary Examiner* — Solomon Bezuayehu
(74) *Attorney, Agent, or Firm* — Cantor Colburn LLP

(57) ABSTRACT

Embodiments relate to extracting contact information from streaming voice data. An aspect includes a speech recognition module configured to transcribe a stream of voice data representing at least a portion of a telephone conversation into text data; a contact information extraction module configured to extract contact information from the text data; and a transceiver configured to send at least a portion of the contact information to a recipient calling device.

19 Claims, 3 Drawing Sheets

(56) References Cited

U.S. PATENT DOCUMENTS

| | | | |
|---|---|---|---|
| 2010/0138441 A1* | 6/2010 | Ryu | 707/769 |
| 2013/0077768 A1 | 3/2013 | Pearce et al. | |
| 2014/0179290 A1* | 6/2014 | Jung | H04W 4/12 |
| | | | 455/415 |
| 2014/0273979 A1* | 9/2014 | Van Os | H04M 3/53333 |
| | | | 455/412.2 |

OTHER PUBLICATIONS

Rodriguez et al., "IBM WebSphere Voice Server 2.0 Implementation Guide," WebSphere Software, IBM-International Technical Support Organization, Redbooks, May 2002, pp. 1-326.

* cited by examiner

COMPUTER-BASED STREAMING VOICE DATA CONTACT INFORMATION EXTRACTION

BACKGROUND

The present disclosure relates generally to speech recognition, and more specifically, to identifying and retrieving contact information in streaming voice data.

The digitization of telephone voice data has promoted the development of voice capture systems, speech recognition systems and data analysis systems directed to the field of switched telephone networks. Speech recognition applications are available to analyze digital voice data in an attempt to transcribe an accurate written-language record of speech.

For example, a voice capture system has been used with a telephone switching system and transcribing terminals to record calling party generated information in predefined formats, digitize and record messages generated by calling parties served by the telephone switching system, and record recognized terminology occurring within the calling party voice messages as file records. Associated transcribing terminals are available to display file record terminology in predefined formats. Recorded digitized calling party messages typically have been transmitted as audio messages via a telephone coupled with the telephone switching system.

Answering machines and voice messaging, or voicemail, services are available to record and store voice data of an incoming caller. Speech recognition is available to convert voice messages into written-language text. Methods and devices are available to extract certain information from recorded voice messages, such as telephone numbers, meeting times and locations. For example, data or information typically has been extracted from voice messages based on identified predetermined key phrases using voice recognition and pattern matching technology.

Automatic number identification (ANI), may provide so-called caller identification, or caller ID. Telephone service providers generally cooperate through the public switched telephone network (PSTN) to provide the telephone call recipient with a telephone number or name registered with the telephone service provider corresponding to the outgoing or originating calling device. For example, the registered name or telephone number associated with the outgoing calling device may be displayed on the incoming or recipient calling device upon receipt of a phone call. Similarly, a dialed number identification service (DNIS) may provide an outgoing or originating calling device with the registered name or telephone number associated with an receiving calling device.

However, some caller identification systems often do not provide useful contact information. Generally, a caller may block caller identification systems from receiving caller information. Outgoing calls from a private branch exchange (PBX), such as those implemented by many business entities, often cannot be associated with a specific calling device or individual. Most individuals access multiple calling devices, for example, depending on the time of day or current location of the caller, but many existing caller identification systems provide only one telephone number.

BRIEF SUMMARY

Embodiments include a method, system, and computer program product for extracting contact information from streaming voice data. The method includes transcribing, with a processing device, a stream of voice data representing at least a portion of a telephone conversation into a string of text data; extracting contact information from the text data; and sending at least a portion of the contact information to a recipient calling device.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Embodiments described herein are directed to analyzing substantially real-time, or streaming, telephone voice data during a live, two-way telephone conversation in order to identify and retrieve or extract useful caller contact information, or other information based on the voice data. An embodiment may further provide a telephone call recipient the option of saving the retrieved or extracted information during or soon after the live telephone call to the recipient's calling device, to a contact information database associated with the recipient or with the recipient's telephone service account.

Although digital voice data streams have been captured and recorded, transcribed into text data, and analyzed to identify and retrieve certain data, these technologies have not typically been used to analyze real-time, or live, telephone voice data in order to identify and retrieve useful caller contact information. In contemporary implementations the telephone call recipient generally is not provided the option of saving the information during or soon after the live telephone call to a contact information database associated with the recipient, the recipient's calling device, or the recipient's telephone service account.

Figure 1:
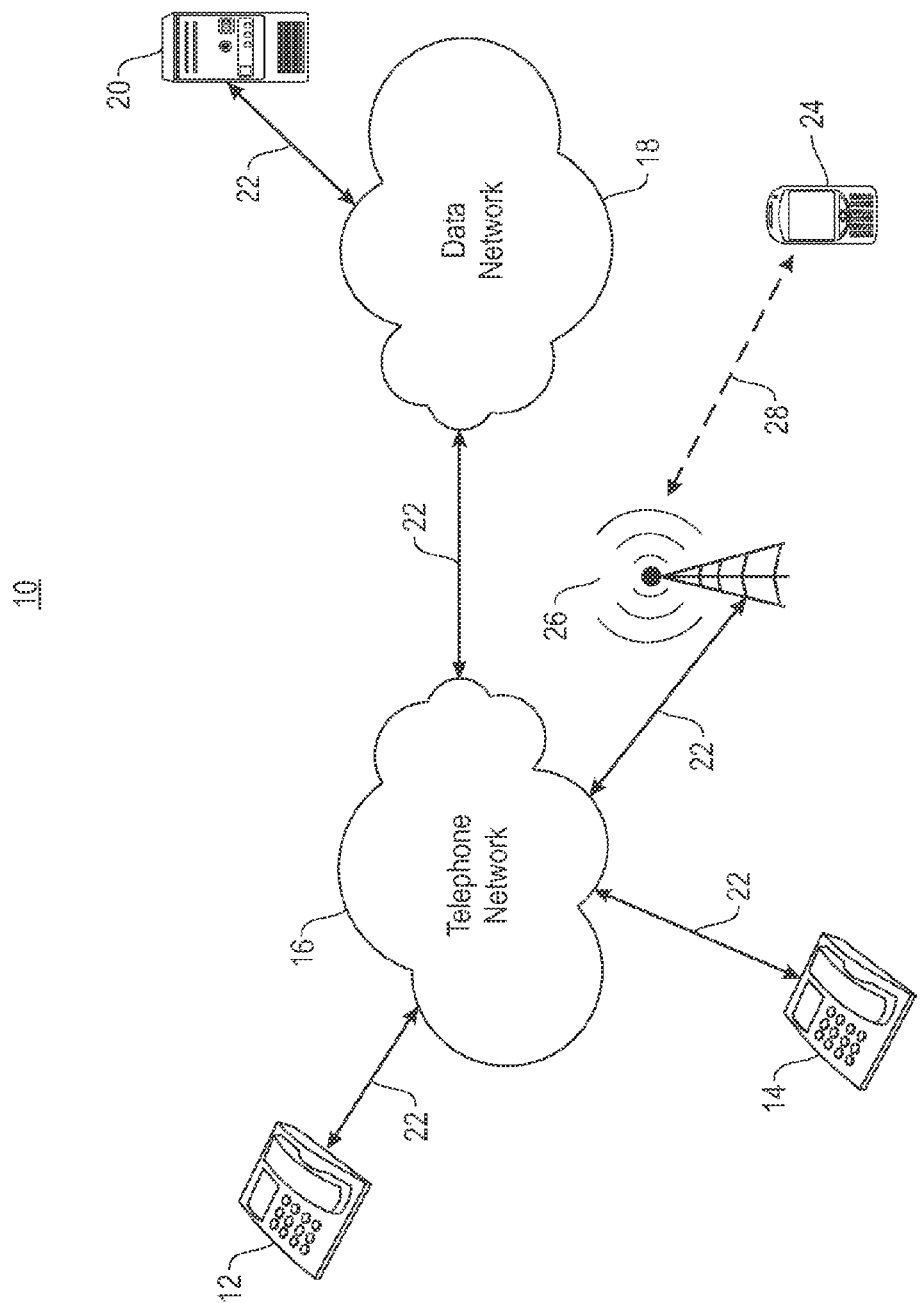
FIG. 1 is a schematic representation of a system for extracting caller contact information from streaming voice data in accordance with an embodiment of the present invention.

With reference now to FIG. 1, an embodiment that includes a streaming voice data contact information extraction system 10, an origination calling device 12, a recipient calling device 14, a telephone network 16, a data network 18, and a remote processing device 20 is generally shown. The origination calling device 12 and the recipient calling device 14 may be communicatively connected to the telephone network 16 by way of analog or digital data links 22. The remote processing device 20 may be communicatively connected to the data network 18, and the data network 18 may be communicatively connected to the telephone network 16 by way of digital data links 22.

The origination calling device 12 and the recipient calling device 14 each may include any device capable of placing or receiving voice communications that have been transduced into analog or digital representations of voice data. In a preferred embodiment, each the origination calling device 12 and the recipient calling device 14 is a telephonic device configured to receive a telephone voice signal in either analog or digital format. A person of ordinary skill in the art will readily apprehend that any combination of numerous existing or future communication device technologies may be implemented in association with an embodiment.

Similarly, the telephone network 16 may include any telephonic system capable of transmitting, receiving, directing or switching voice communications that have been transduced into analog or digital representations of voice data. For example, in any embodiment, the telephone network 16 may include a public switched telephone network (PSTN), a private branch exchange (PBX), a cellular telephone network, or the like. In any embodiment, any portion or all of the data network 18 may be implemented using physical connections, radio frequency or wireless technology. A person of ordinary skill in the art will readily apprehend that any combination of numerous existing or future communication network technologies may be implemented in association with an embodiment.

Likewise, the data network 18 may include any interconnected array of computing devices capable of transmitting, receiving, directing or routing digital data. For example, in any embodiment, the data network 18 may be implemented using any type or combination of known communications networking devices, including but not limited to a local area network (LAN), a wide area network (WAN), an intranet, a global network (e.g., the Internet), a virtual private network (VPN), or the like. In any embodiment, any portion or all of the data network 18 may be implemented using physical connections, radio frequency or wireless technology. A person of ordinary skill in the art will readily apprehend that any combination of numerous existing or future communication network technologies may be implemented in association with an embodiment.

The data links 22 may include any connective medium capable of transmitting analog or digital data, as the specific application may require. For example, in any embodiment, the data links 22 may be implemented using any type of combination of known communications connections, including but not limited to twisted pairs of wires, digital data buses, a universal serial bus (USB), an Ethernet bus or cable, a wireless access point, or the like. In any embodiment, any portion or all of the data links 22 may be implemented using physical connections, radio frequency or wireless technology. A person of ordinary skill in the art will readily apprehend that any combination of numerous existing or future communication network technologies may be implemented in association with an embodiment.

The remote processing device 20 may include any computer processing device capable of supporting speech recognition and data analysis. For example, in any embodiment, the remote processing device 20 may be implemented using a mainframe computer, a server, a desktop personal computer, a laptop computer, a notebook computer, a tablet computing device, a mobile computing device, or any other suitable computer processing device.

In any embodiment, the remote processing device 20 may further include one or more memory devices, including by not limited to read-only memory (ROM), random access memory (RAM), or a cache memory; one or more an input/output (I/O) devices, including but not limited to a monitor, a keyboard, a pointing device; one or more storage devices, including but not limited to a hard disk drive (HDD), a compact disk (CD) drive, an integral or removable solid-state memory device (SSD); a network connection interface; as well as other integral, peripheral or accessory computer components as are known in the art. The remote processing device 20 may incorporate any suitable computer software, such as, for example, a speech recognition application and a data analysis application.

The recipient calling device 14 may be configured to send, upon receipt of a telephone call, a stream of voice data, or audio stream, through the telephone network 16 and data network 18 to the remote processing device 20, which may be configured to receive the stream of voice data. In an embodiment, the remote processing device 20 may include a transceiver that receives the voice data. In another embodiment, the remote processing device 20 may be linked to a peripheral transceiver device that receives the voice data. For example, in an embodiment, the recipient calling device 14 may incorporate a voice recorder that records the initial audio stream of a phone conversation, for example, in various embodiments, the first 10 seconds, the first 20 seconds, or the first 30 seconds of the conversation. The recipient calling device 14 may forward the voice data to the remote processing device 20. In an alternative embodiment, the period or length of the initial audio stream recorded and forwarded from the recipient calling device 14 to the remote processing device 20 may vary, for example, based on the content of the voice data, as determined by the remote processing device 20 and communicated to the recipient calling device 14.

In an alternative embodiment, remote processing device 20 may be configured to intercept the audio stream such that the recipient calling device 14 is not required to send the voice data to the remote processing device 20. For example, the recipient calling device 14 may be a traditional analog telephone that is not equipped to recognize or interpret a digital signal, and the remote processing device 20 may be configured to monitor incoming telephone calls to the recipient calling device 14 and capture or record the initial audio stream, such as, for example, as a service provided by a telephone service provider corresponding to the recipient calling device 14 or by a third-party service provider.

The remote processing device 20 may utilize, apply, or implement speech recognition technology to transcribe the received audio stream into written-language text. In various embodiments, a speech recognition application may implement any known natural language. In an alternative embodiment, the speech recognition application may be configured to identify the language, or languages, used in the telephone conversation and transcribe the audio stream into the identified language or languages.

The remote processing device 20 may apply data analysis techniques to identify possible caller contact information in the stream of voice data. For example, the remote processing device 20 may utilize syntactic analysis to parse the audio data, for example, to resolve the data stream into component parts of speech, such as discrete words and sentences, or to resolve names, or derivations of names. For example, the voice data may be compared to known words or names in a database, such as telephone listings or the like. The remote processing device 20 may further apply techniques of computational linguistics to resolve grammatical, inflective or syntactic relationships of the words and phrases in the audio stream in order to ultimately identify semantic information regarding the audio stream and its constituent parts, as well as apply word-sense disambiguation (WSD) to determine the sense or meaning of a word or phrase that can have multiple conflicting meanings.

The remote processing device 20 may identify key words or key phrases in the stream of voice data in order to identify caller contact information, such as the caller's name, nickname, company, organization, department, work telephone number, home telephone number, mobile telephone number, postal address, office location or address, home address, work email address, personal email address, web page or uniform resource locator (URL), or the like. In various embodiments, phrases may include unigrams (single terms), bigrams (two terms), trigrams (three terms), or phrases that include more than three terms. The remote processing device 20 may further attempt to disambiguate conflicting redundant information, or to complete partial information, in order to specifically identify caller contact information.

The remote processing device 20 may retrieve, or extract, the caller contact information from the stream of voice data, organize the caller contact information in a format that can be transmitted to the recipient calling device 14, and send the caller contact information through the data network 18 and telephone network 16 to the recipient calling device 14.

The recipient calling device 14 may be configured to receive and save the caller contact information. For example, the recipient calling device 14 may be configured to receive the caller contact information from the remote processing device 20 and notify the call recipient, or user of the recipient calling device 14, that contact information is available to be saved to the recipient calling device 14, or to a contact information database associated with the recipient or with the recipient's telephone service account. For example, the recipient calling device 14 may be configured to display an inquiry regarding whether or not the call recipient would like to save the caller contact information.

In an embodiment, the recipient calling device 14 may further be configured to ask whether the call recipient would like to save the contact information to an existing contact record or create a new contact record. In another embodiment, the recipient calling device 14 may be configured to compare the received caller contact information to existing contact records and suggest saving the contact information to a specified existing contact record or creating a new contact record.

In an alternative embodiment, the streaming voice data contact information extraction system 10 may include a mobile device 24, such as a cellular telephone, and a mobile communications tower 26, such as a cellular tower. The mobile communications tower 26 may be communicatively connected to the telephone network 16 by way of a data link 22 and may relay telephone communications signals and data signals to the mobile device 24 by way of a wireless link 28, or radio frequency signal. In this alternative embodiment, the mobile device 24 may receive the telephone call and forward the stream of voice data to the remote processing device 20, and the remote processing device 20 may send the caller contact information to the mobile device 24, which may save the contact information, as described above with regard to the recipient calling device 14.

In other embodiments, a streaming voice data contact information extraction system may include any device capable of telephonic communications, for example, a personal digital assistant (PDA), an internet protocol (IP) phone, a personal computer using voice-over-internet (VoIP) technology, or an onboard vehicle communication system, or any other suitable calling device. In another embodiment, the speech recognition and contact information extraction functionality may be incorporated into a recipient calling device 14 or mobile device 24 that has sufficient processing capacity to perform these functions, and the streaming voice data may be analyzed, and contact information extracted by the recipient calling device 14 or mobile device 24 without sending the data to the remote processing device 20.

Figure 2:
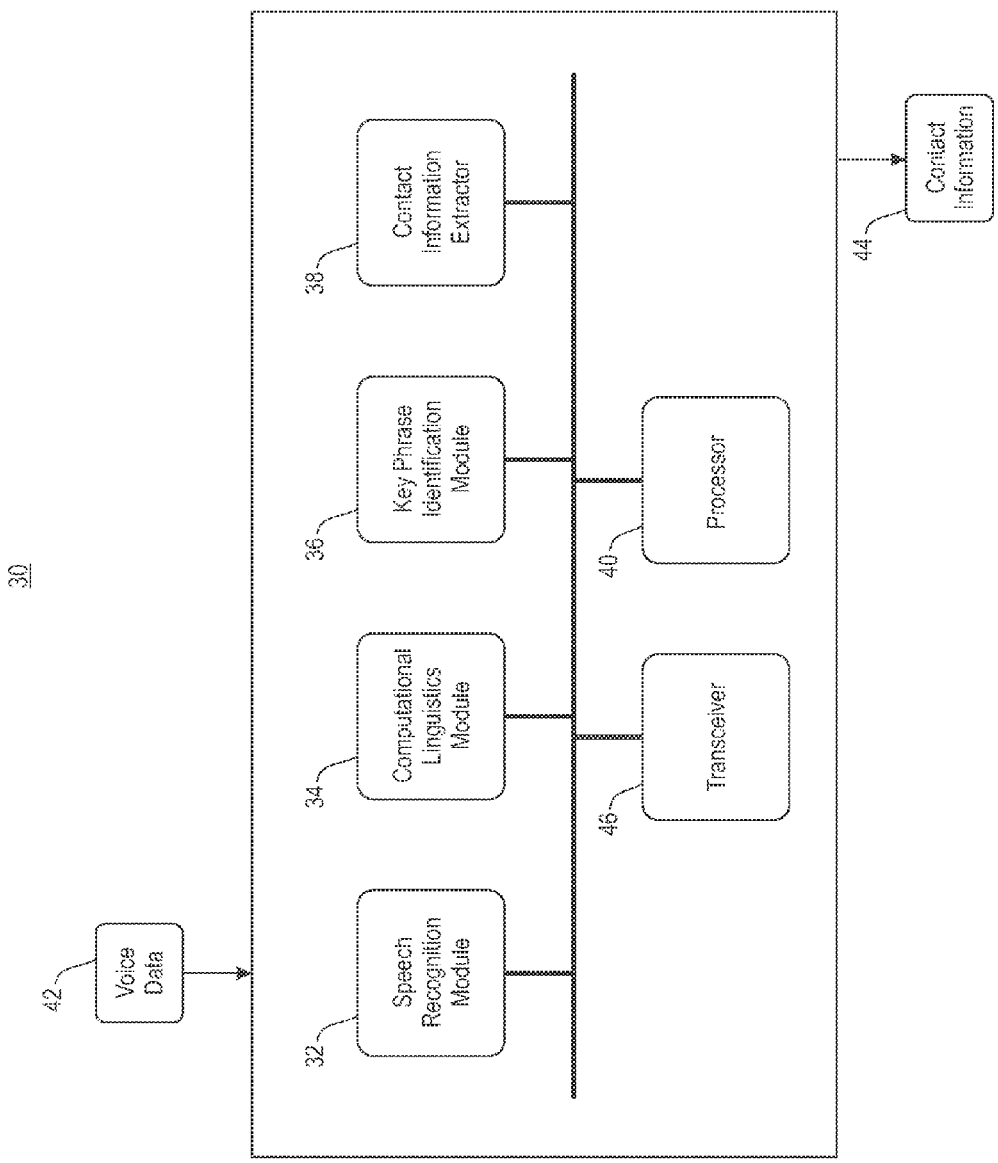
FIG. 2 is a schematic diagram of another system for extracting caller contact information from streaming voice data in accordance with an embodiment of the present invention.

FIG. 2 depicts a streaming voice data contact information extraction system 30 in accordance with an embodiment. In various embodiments, the streaming voice data contact information extraction system 30 may be implemented, for example, in the remote processing device 20, in the recipient calling device 14 or in the mobile device 24 of FIG. 1. The streaming voice data contact information extraction system 30 may include a speech recognition module 32, a computational linguistics module 34, a key phase identification module 36, a contact information extraction module 38, a processor 40 and a transceiver 46. The transceiver 46 may be configured to receive voice data 42, such as, for example, an initial audio stream of a telephone conversation received by a recipient calling device, and to extract and send or return extracted contact information 44, for example, to the recipient calling device.

The speech recognition module 32 may apply speech recognition technology to transcribe the received audio stream, or voice data 42, into written-language text. In various embodiments, the speech recognition module 32 may implement any known natural language. In an alternative embodiment, the speech recognition module 32 may be configured to identify the language, or languages, used in the telephone conversation and transcribe the audio stream into the identified language or languages.

Speech recognition, that is, the recognition of human speech by a computer, typically incorporates voice technology that translates spoken input, or voice data, into text data. In some embodiments, speech recognition may be performed, for example, by a software component known as the speech recognition engine, such as the speech recognition module 32, whose primary function is to process speech input and translate it into text.

The speech recognition module 32 may rely on statistics and software algorithms to analyze the incoming audio signal and to search for the best match of the voice data 42 to known textual words and phrases, referred to in an embodiment as active grammars, and the environment, referred to in an embodiment as an acoustic model. Once the most likely match has been identified, the speech recognition module 32 may return it as a text string. The speech recognition module 32 may incorporate error checking routines, for example, based on a confidence level regarding the speech recognition result.

The speech recognition module 32 may include a voice model, for example, including a set of parameters associated with a natural language, such as the English language. In an embodiment, the voice model may include a "baseform" that stores phonetic descriptions of known words or phrases, and a "grammar" that stores descriptions of acceptable words and sequences of multiple words relevant to the natural language.

For example, in an embodiment, an audio string, or utterance, of any length may be presented to the speech recognition module 32, which may search the currently loaded grammar for possible word matches. In an embodiment, a voice application may contain up to 65,536 words and use more than one grammar. The response time may be affected, for example, by the length of the utterance and the size of the grammar.

In an embodiment, the speech recognition module 32 may be trained to an individual's voice signature. However, in a server-based embodiment the speech recognition module 32 may be designed to service a wide variety of voice signatures.

In an embodiment, the speech recognition module 32 may be a natural language understanding dialog, which may require relatively complex grammars and application logic, because the application must attempt to recognize meaning from the audio stream with little or no initial knowledge of the context.

The computational linguistics module 34 may apply data analysis techniques to identify possible caller contact information in the stream of voice data 42. For example, the computational linguistics module 34 may utilize syntactic analysis to parse the audio data, for example, to resolve the data stream into component parts of speech, such as discrete words and sentences. The computational linguistics module 34 may further apply additional computational linguistic techniques to resolve grammatical, inflective or syntactic relationships of the words and phrases in the audio stream in order to ultimately identify semantic information regarding the audio stream and its constituent parts, as well as apply word-sense disambiguation (WSD) to determine the sense or meaning of individual words or phrases that can have multiple conflicting meanings.

The key phase identification module 36 may identify key words or key phrases in the stream of voice data 42 in order to identify caller contact information 44, such as the caller's name, nickname, company, organization, department, work telephone number, home telephone number, mobile telephone number, postal address, office location or address, home address, work email address, personal email address, web page or uniform resource locator (URL), or the like. The key phase identification module 36 may further attempt to disambiguate conflicting redundant information, or to complete partial information, in order to specifically identify caller contact information 44.

The contact information extraction module 38 may retrieve, or extract, the caller contact information 44 from the stream of voice data 42. For example, the contact information extraction module 38 may analyze the identified key words and key phrases and retrieve the key words, portions of key phrases, or words found in conjunction with the key words or phrases, such as individual words or groups of words that precede or follow a key word or key phrase. The contact information extraction module 38, may further organize the extracted caller contact information 44 in a format that can be transmitted to a recipient calling device or associated database, such as for example, a text file, a comma-delimited file, or comma-separated values (CSV) file, a tab-separated values (TSV) file, an electronic business card (vCard) file, a hypertext markup language (HTTP) file, an extensible markup language (XML) file, a proprietary database record file, or any other data format suitable for transmission to a recipient calling device or associated database.

The streaming voice data contact information extraction system 30 may send the retrieved caller contact information 44 to a recipient calling device or to a contact information database associated with the recipient calling device or a call recipient, or to a contact information database associated with a telephone service account that corresponds to the recipient calling device or a call recipient.

Figure 3:
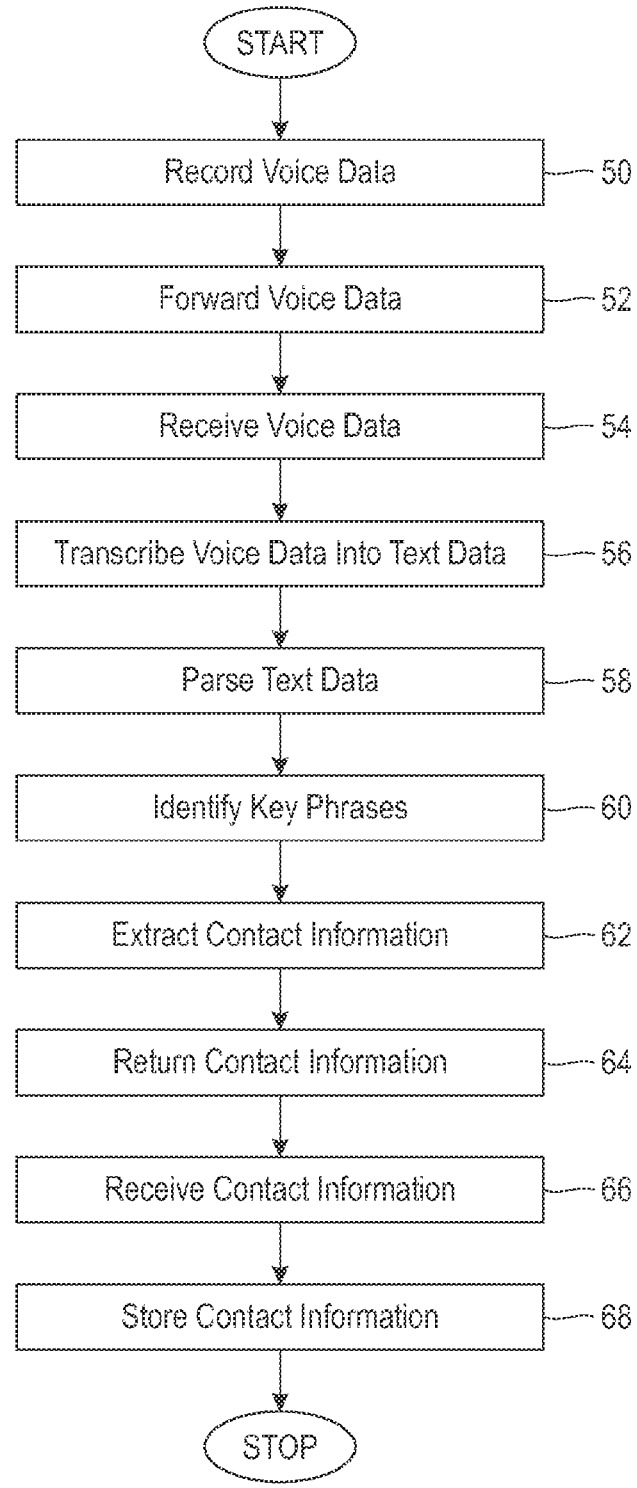
FIG. 3 is a block diagram of a method for extracting caller contact information from streaming voice data in accordance with an embodiment of the present invention.

FIG. 3 is a block diagram depicting a method of extracting contact information from streaming voice data in accordance with an embodiment. The method may be performed, for example, by program code executing on the processor of FIG. 2. In block 50, an audio stream, or a stream of voice data, may be recorded, for example, by a recipient recording device, a digital voice capture system, a telephone service provider or a third-party service provider, during a live telephone conversation between a caller and a call recipient. For example, if an incoming phone call number identified by caller ID does not match any address book entry stored in a recipient calling device, the first 10 seconds, the first 20 seconds, the first 30 seconds, or any other suitable length or amount of the telephone conversation may be recorded.

In an alternative embodiment, the amount or length of voice data recorded may be variable. For example, in various embodiments, the recording length may depend on the incoming phone call area code, the identity of the call recipient, pauses or turn-taking behavior during the conversations, or contact information detected in the audio stream.

In block 52, the stream of voice data may be forwarded or transmitted, for example, over a network to a remote server, which may receive the voice data for processing in block 54. In an alternative embodiment, the recipient calling device may have sufficient processing capability to perform the parsing, voice recognition and information extraction, and may perform these functions locally without forwarding the voice data to a server.

The voice data may be transcribed into a string of text data in block 56. For example, a natural language associated with the audio stream may be detected and the voice data may be transcribed into an electronic representation of the written-language text using automatic speech recognition technology. In block 58, the text data may be parsed, for example, applying computational linguistics techniques, for example, to resolve the text data into component grammatical parts and resolve grammatical, inflective or syntactic relationships of the words and phrases in the audio stream in order to ultimately identify semantic information regarding the audio stream and its constituent parts, as well as apply word-sense disambiguation (WSD) to determine the sense or meaning of a word or phrase that can have multiple conflicting meanings.

In block 60, key words and key phrases may be identified within the text data. For example, the text may be searched for known key terms that may represent or may be associated with contact information, such as "my phone number," "my home number," "my work number," "my number is," "call me at," "my e-mail address," "my fax number," or "my cell number," "meet me at," "my address," or the like.

Contact information may be extracted from the text in block 62. For example, the identified key words, portions of the identified key phrases, or information preceding or following identified key words or phrases may be retrieved, or extracted, from the text as contact information. Contact information may include, for example, the caller's name, nickname, company, organization, department, work telephone number, home telephone number, mobile telephone number, postal address, office location or address, home address, work email address, personal email address, web page or uniform resource locator (URL), or the like.

The extracted contact information may be structured, for example, in a known database format, and returned, in block 64, for example, to a recipient calling device, such as a mobile client, or to a service provider for further processing, which may receive the contact information in block 66. In block 68, the contact information may be stored, for example, in a recipient calling device address book or in a service provider database. For example, after the phone call has ended, the recipient calling device, such as a mobile client, may determine if the retrieved contact information is likely to be a new contact based on matching of the extracted details with existing address book entries, and present the device user, or call recipient, with an option to save the retrieved contact information in an electronic address book.

For example, if the device determines the information is associated with a new contact, once the phone call has been terminated, the device may provide an efficient mechanism, including a user interface, such as a graphical user interface (GUI), for adding the contact details to the device address book. In an embodiment, the user may be given the option of editing the captured contact details before committing these to the stored address book.

In various embodiments, several different methods, or mechanisms, may be applied in order to distinguish new contacts from existing contacts, or to estimate the probability that contact information belongs to a new contact. For example, in an embodiment, an exchange number, such as a private branch exchange (PBX) number may be identified, as opposed to an individual phone extension. In another embodiment, the use of first name(s) only during the conversation may identify existing contacts, as opposed to the use of full names, which may identify new contacts.

Technical effects and benefits include processing voice data in a manner such that significant information, such as names, phone numbers, meeting times, and locations, may be identified, extracted, and output. Voice data may be recorded during live, two-way telephone conversations. In addition, the telephone call recipient may be given the option to save caller contact information during or soon after a live telephone call to a contact information database associated with the recipient, the recipient's calling device, or the recipient's telephone service account.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for extracting contact information from streaming voice data, the method comprising:

transcribing, into a string of text data, a stream of voice data representing a portion of a telephone conversation between a caller at an origination calling device and a call recipient at a recipient calling device, the transcribing performed automatically by a processor based on a determination that a caller identifier (ID) of the origination calling device does not match an entry in an address book located on the recipient calling device;

identifying, by the processor, at least one key word or key phrase in the text data;

extracting contact information from the text data, the extracting by the processor and including extracting information preceding or following the identified key word or key phrase as at least a portion of the contact information;

determining whether the caller is identified in the contact information by a first name only or by a full name;

determining a probability that the caller is associated with an entry in the address book based at least in part on whether the caller is identified in the contact information by a first name only or by a full name, wherein a caller identified by a first name only has a higher probability of being associated with an entry in the address book than a caller identified by a full name;

performing the transcribing for an amount of time that is based at least in part on the probability that the caller is associated with an entry in the address book, wherein the amount of time decreases as the probability increases; and prompting the call recipient to store at least a portion of the contact information to the recipient calling device, the prompting based at least in part on the probability that the caller is associated with an entry in the address book being below a threshold.

2. The method of claim 1, wherein the stream of voice data is transcribed during the telephone conversation between the caller and the call recipient.

3. The method of claim 1, wherein the stream of voice data is recorded during the telephone conversation between the caller and the call recipient.

4. The method of claim 1, wherein the transcribing comprises applying speech recognition technology.

5. The method of claim 1, further comprising identifying a phrase associated with the caller in the text data.

6. The method of claim 1, wherein the storing is in the address book.

7. A system for extracting contact information from streaming voice data, the system comprising:

a memory having computer readable computer instructions; and a processor for executing the computer readable instructions, the computer readable instructions including:

transcribing, into a string of text data, a stream of voice data representing a portion of a telephone conversation between a caller at an origination calling device and a call recipient at a recipient calling device and send contact information to the recipient calling device, the transcribing performed automatically based on a determination that a caller identifier (ID) of the origination calling device does not match an entry in an address book located on the recipient calling device;

identifying at least one key word or key phrase in the text data;

extracting the contact information from the text data, the extracting including extracting information preceding or following the identified key word or key phrase as at least a portion of the contact information;

determining whether the caller is identified in the contact information by a first name only or by a full name;

determining a probability that the caller is associated with an entry in the address book based at least in part on whether the caller is identified in the contact information by a first name only or by a full name, wherein a caller identified by a first name only has a higher probability of being associated with an entry in the address book than a caller identified by a full name;

performing the transcribing for an amount of time that is based at least in part on the probability that the caller is associated with an entry in the address book, wherein the amount of time decreases as the probability increases; and prompting the call recipient to store at least a portion of the contact information to the recipient calling device, the prompting based at least in part on the probability that the caller is associated with an entry in the address book being below a threshold.

8. The system of claim 7, wherein the stream of voice data is transcribed during the telephone conversation between the caller and the call recipient.

9. The system of claim 7, further comprising a computational linguistics module configured to analyze the text data to determine the meaning of a word.

10. The system of claim 7, further comprising a key phrase identification module configured to identify a phrase associated with the caller in the text data.

11. The system of claim 7, wherein the stream of voice data is transcribed during the telephone conversation between the caller and the call recipient.

12. The system of claim 7, wherein the storing is in the address book.

13. A computer program product for extracting contact information from streaming voice data, the computer program product comprising:

a non-transitory computer readable storage medium having program code embodied therewith, the program code executable by a computer to implement:

transcribing, into a string of text data, a stream of voice data representing a portion of a telephone conversation between a caller at an origination calling device and a call recipient at a recipient calling device, the transcribing performed automatically based on a determination that a caller identifier (ID) of the origination calling device does not match an entry in an address book located on the recipient calling device;

identifying at least one key word or key phrase in the text data;

extracting contact information from the text data, the extracting including extracting information preceding or following the identified key word or key phrase as at least a portion of the contact information;

determining whether the caller is identified in the contact information by a first name only or by a full name;

determining a probability that the caller is associated with an entry in the address book based at least in part on whether the caller is identified in the contact information by a first name only or by a full name, wherein a caller identified by a first name only has a higher probability of being associated with an entry in the address book than a caller identified by a full name;

performing the transcribing for an amount of time that is based at least in part on the probability that the caller is associated with an entry in the address book, wherein the amount of time decreases as the probability increases; and prompting the call recipient to store at least a portion of the contact information to the recipient calling device, the prompting based at least in part on the probability that the caller is associated with an entry in the address book being below a threshold.

14. The computer program product of claim 13, wherein the stream of voice data is transcribed during the telephone conversation between the caller and the call recipient.

15. The computer program product of claim 13, wherein transcribing further comprises applying speech recognition technology.

16. The computer program product of claim 13, wherein the storing is in the address book.

17. The method of claim 6, wherein the storing is during the telephone conversation.

18. The system of claim 12, wherein the storing is during the telephone conversation.

19. The computer program product of claim 16, wherein the storing is during the telephone conversation.

* * * * *